US012579736B2

(12) United States Patent
Yoo et al.

(10) Patent No.: US 12,579,736 B2
(45) Date of Patent: Mar. 17, 2026

(54) METHOD AND DEVICE FOR GENERATING THREE-DIMENSIONAL IMAGE BY USING PLURALITY OF CAMERAS

(71) Applicant: SAMSUNG ELECTRONICS CO., LTD., Suwon-si (KR)

(72) Inventors: Byeongwook Yoo, Suwon-si (KR); Wonwoo Lee, Suwon-si (KR); Jaewoong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 456 days.

(21) Appl. No.: 18/097,890

(22) Filed: Jan. 17, 2023

(65) Prior Publication Data

US 2023/0222727 A1 Jul. 13, 2023

Related U.S. Application Data

(63) Continuation of application No. PCT/KR2023/000170, filed on Jan. 4, 2023.

(30) Foreign Application Priority Data

Jan. 10, 2022 (KR) ........................ 10-2022-0003457

(51) Int. Cl.
G06T 15/20 (2011.01)
G06T 3/18 (2024.01)
(Continued)

(52) U.S. Cl.
CPC .............. G06T 15/205 (2013.01); G06T 3/18 (2024.01); G06T 5/50 (2013.01); G06T 5/77 (2024.01);
(Continued)

(58) Field of Classification Search
None
See application file for complete search history.

(56) References Cited

U.S. PATENT DOCUMENTS 9,918,072 B2    3/2018 Kim et al.
10,038,894 B1   7/2018 Kopf et al.
(Continued)

FOREIGN PATENT DOCUMENTS

CN      110661971 A     1/2020
JP      2021-2783 A     1/2021
(Continued)

OTHER PUBLICATIONS

Bhawana A. Ahire et al., "Image Inpainting Techniques Applicable to Depth Based Rendering: A Review", 2018, Fourth International Conference on Computing Communication Control and Automation (Year: 2018).*

(Continued)

*Primary Examiner* — Michael J Cobb
(74) *Attorney, Agent, or Firm* — Sughrue Mion, PLLC

(57) ABSTRACT

A method, performed by an electronic device, of generating a three-dimensional (3D) image, includes: obtaining a first image through a first camera of the electronic device and obtaining a second image through a second camera of the electronic device; obtaining depth information of a pixel included in the first image; identifying, based on the depth information, a first layer image and a second layer image from the first image; inpainting, based on the first image and the second image, at least a part of the first layer image; and generating, based on the second layer image and the
(Continued)

inpainted first layer image, the 3D image including a plurality of layers.

15 Claims, 13 Drawing Sheets

(51) Int. Cl.
| | |
|---|---|
| *G06T 5/50* | (2006.01) |
| *G06T 5/77* | (2024.01) |
| *G06T 7/194* | (2017.01) |
| *G06T 7/55* | (2017.01) |

(52) U.S. Cl.
CPC ................ *G06T 7/194* (2017.01); *G06T 7/55* (2017.01); *G06T 2207/20081* (2013.01); *G06T 2207/20132* (2013.01)

(56) References Cited

U.S. PATENT DOCUMENTS

| | | | |
|---|---|---|---|
| 10,523,917 | B2 | 12/2019 | Zeng et al. |
| 10,554,898 | B2 | 2/2020 | Ouyang et al. |
| 10,848,746 | B2 | 11/2020 | Han et al. |
| 2016/0037152 | A1 | 2/2016 | Kim et al. |

FOREIGN PATENT DOCUMENTS

| | | | |
|---|---|---|---|
| JP | 7257272 | B2 | 4/2023 |
| KR | 10-2008-0102826 | A | 11/2008 |
| KR | 10-2016-0015737 | A | 2/2016 |
| KR | 10-2020-0075727 | A | 6/2020 |
| KR | 10-2020-0114170 | A | 10/2020 |
| KR | 10-2172992 | B1 | 11/2020 |

OTHER PUBLICATIONS

Meng-Li Shih et al., "3D Photography using Context-Aware Layered Depth Inpainting," 2020, Proceedings of the IEEE/CVF Conference on Computer Vision and Pattern Recognition (CVPR), pp. 8028-8038 (Year: 2020).*

Shih et al. "3D Photography using Context-Aware Layered Depth Inpainting", 2020, Proceedings of the IEEE/CVF Conference on Computer Vision and Pattern Recognition (CVPR), pp. 8028-8038 (Year: 2020).*

Srivastava et al. "i23—Rapid Interactive 3D Reconstruction from a Single Image", 2009, VMV, pp. 1-6 (Year: 2009).*

Yong-Jin Kim et al., "A High-Quality Occlusion Filling Method Using Image Inpainting", Journal of Broadcast Engineering, 2010, vol. 15, Issue 1, pp. 3-13.

International Search Report and Written Opinion issued by the International Searching Authority on Apr. 13, 2023 in International Patent Application No. PCT/KR2023/000170 (PCT/ISA/220, PCT/ISA/210, and PCT/ISA/237).

Kopf et al., "One Shot 3D Photography," arXiv:2008.12298v2 [cs.CV], ACM Trans. Graph., vol. 39, No. 4, Article 76, Jul. 2020, Total 13 pages.

* cited by examiner

FIG. 2

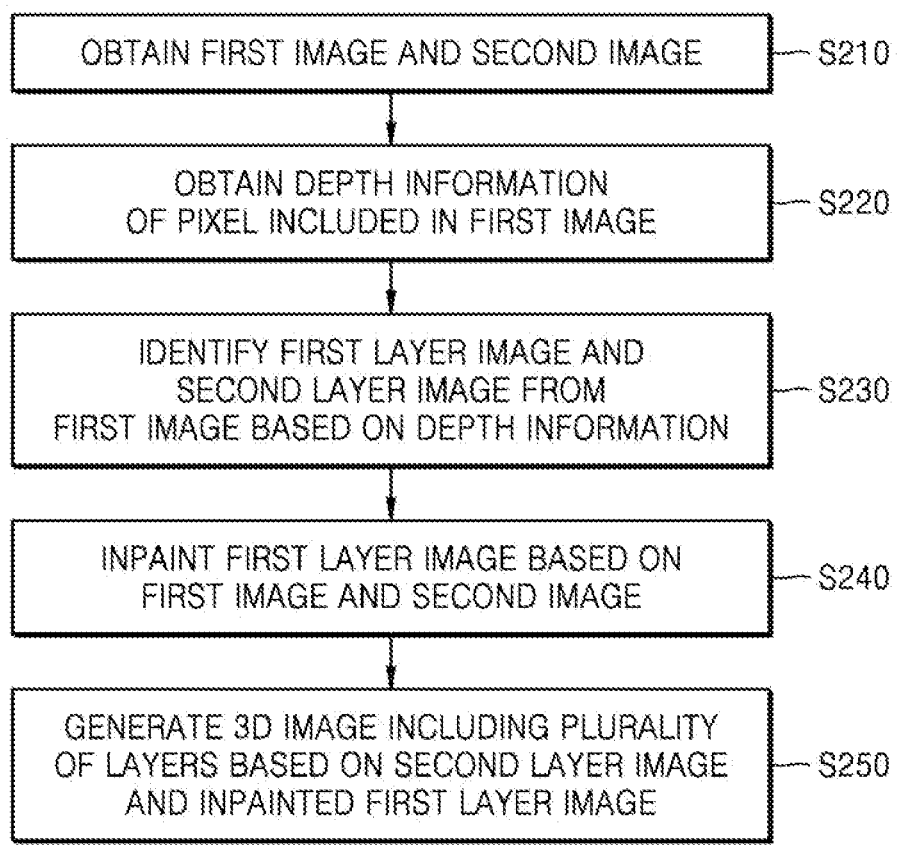

OBTAIN FIRST IMAGE AND SECOND IMAGE — S210

OBTAIN DEPTH INFORMATION
OF PIXEL INCLUDED IN FIRST IMAGE — S220

IDENTIFY FIRST LAYER IMAGE AND
SECOND LAYER IMAGE FROM
FIRST IMAGE BASED ON DEPTH INFORMATION — S230

INPAINT FIRST LAYER IMAGE BASED ON
FIRST IMAGE AND SECOND IMAGE — S240

GENERATE 3D IMAGE INCLUDING PLURALITY
OF LAYERS BASED ON SECOND LAYER IMAGE
AND INPAINTED FIRST LAYER IMAGE — S250

FIG. 7A
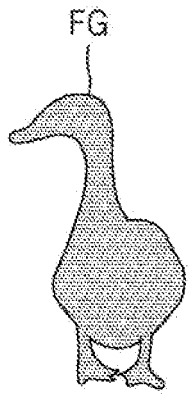
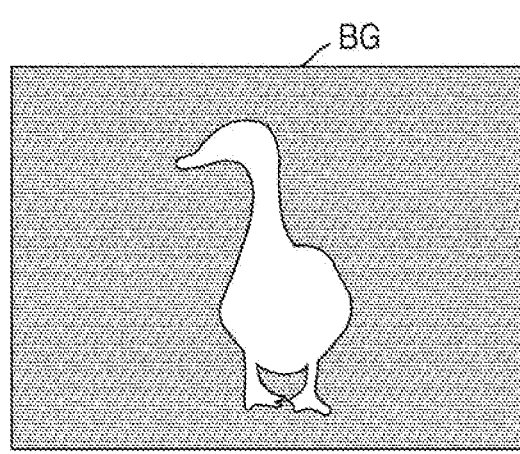

FIG. 7B
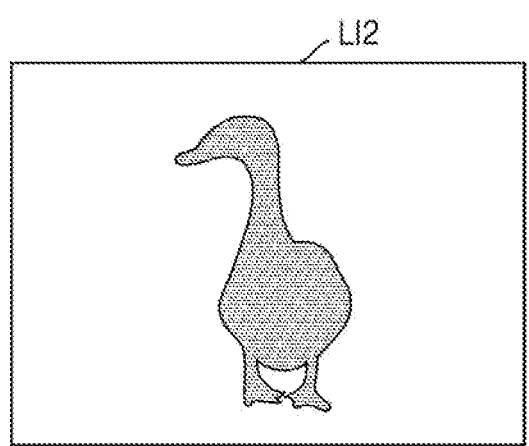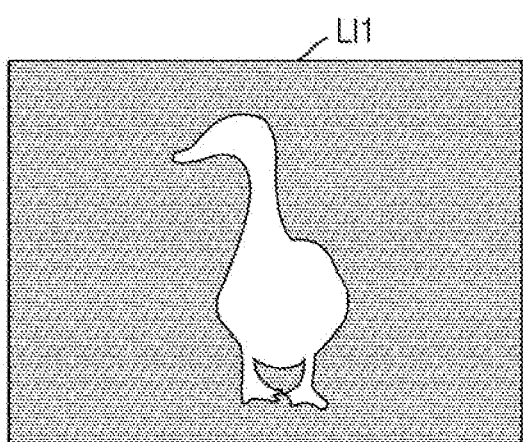

METHOD AND DEVICE FOR GENERATING THREE-DIMENSIONAL IMAGE BY USING PLURALITY OF CAMERAS

CROSS-REFERENCE TO RELATED APPLICATIONS

This application is a by-pass continuation application of International Application No. PCT/KR2023/000170, filed on Jan. 4, 2023, which based on and claims priority to Korean Patent Application No. 10-2022-0003457, filed on Jan. 10, 2022, in the Korean Intellectual Property Office, the disclosures of which are incorporated by reference herein in their entireties.

BACKGROUND

1. Field

The disclosure relates to a method and an electronic device for generating a three-dimensional (3D) image from an image obtained by using a plurality of cameras having different field of view (FOVs).

2. Description of Related Art

Recently, the demand for various digital camera products has been increasing, and interest has also been focused on a 3D camera for capturing 3D images. A general two-dimensional (2D) camera captures one scene by using one photographing lens and one image sensor. To capture a 3D image, like the human eye, at least two photographing lenses and two image sensors are required. When a person looks at an object with both eyes, the eyes have different optical axes. Accordingly, a 2D image viewed by the left eye and a 2D image viewed by the right eye have different geometrical arrangements, and a sense of depth may be recognized from such a difference.

Recently, with the development of technology, a single 2D image may be converted into a 3D image, but its quality is limited. Accordingly, various designs for a 3D camera including two or more cameras are presented to capture images of at least two different viewpoints.

Various electronic products may include cameras. For example, a mobile phone may include one or more cameras, and a user may take a picture or a video by using the cameras installed in the mobile phone. Because a field of view of the camera is limited, it is difficult to accurately represent a 3D object in a 3D space by using one camera. A plurality of cameras may be used to accurately represent the 3D object in the 3D space.

With the recent development of technology, supply of content providing virtual reality (VR) or augmented reality (AR) is also increasing. In AR technology, virtual objects or information is synthesized with a real environment so that the virtual objects or information looks like objects in a real physical environment. Modern computing and display technologies have enabled the development of systems for AR experiences. In such AR experiences, a digitally-regenerated image or a part thereof may be presented to users in such a way as to be perceived or thought of as being real. In order to implement more realistic AR technology, technology for generating realistic 3D images is required.

SUMMARY

Provided are an electronic device and a method capable of using more pixel information in an inpainting operation of an image by generating a 3D image from a plurality of images obtained by using a plurality of cameras having different field of view (FOVs), and capable of generating a realistic 3D image by reducing artifacts occurring on a boundary part between a foreground image and a background image.

Additional aspects will be set forth in part in the description which follows and, in part, will be apparent from the description, or may be learned by practice of the presented embodiments.

According to an aspect of the disclosure, a method, performed by an electronic device, of generating a three-dimensional (3D) image, includes: obtaining a first image through a first camera of the electronic device and obtaining a second image through a second camera of the electronic device; obtaining depth information of a pixel included in the first image; identifying, based on the depth information, a first layer image and a second layer image from the first image; inpainting, based on the first image and the second image, at least a part of the first layer image; and generating, based on the second layer image and the inpainted first layer image, the 3D image including a plurality of layers.

A second field of view (FOV) of the second camera may be larger than a first FOV of the first camera, and a region corresponding to the first image may be included in a region corresponding to the second image.

The method may further include preprocessing the second image, and the preprocessing the second image may include cropping the second image or warping an axis of the second image.

The obtaining the depth information of the pixel included in the first image may include obtaining depth information of a first pixel, based on a parallax between the first pixel included in the first image and a second pixel included in the second image and corresponding to the first pixel.

The obtaining the depth information of the pixel included in the first image may include using an artificial intelligence model trained to output a depth map including depth information of pixels included in the first image by using the first image as an input value.

The identifying the first layer image and the second layer image from the first image based on the depth information may include: identifying an image region corresponding to a target object as the second layer image; and identifying a region of the first image excluding the second layer image as the first layer image.

The inpainting the at least the part of the first layer image may include: determining an inpainting region to be inpainted in the first layer image; determining an image, from among the first image and the second image, to be used for determining a pixel value of a specific pixel in the inpainting region; and determining the pixel value of the specific pixel, based on the determined image.

The inpainting region may include at least a part of a region corresponding to the second layer image, and the inpainting region may be determined based on a depth map corresponding to the first image.

The determining the image to be used for determining the pixel value of the specific pixel may be performed based on a relative location of the specific pixel in the inpainting region.

The determining the image to be used for determining the pixel value of the specific pixel may include: identifying an object image corresponding to the specific pixel; based on the corresponding object image being entirely included in the first image, determining the first image as the image to be used for determining the pixel value of the specific pixel;

and based on the corresponding object image not being entirely included in the first image, determining the second image as the image to be used for determining the pixel value of the specific pixel.

The 3D image may include a first layer and a second layer, and the generating the 3D image may include rendering the inpainted first layer image on the first layer and rendering the second layer image on the second layer.

According to an aspect of the disclosure, an electronic device includes: a first camera; a second camera; a storage storing one or more instructions; and at least one processor configured to execute the one or more instructions stored in the storage to: obtain a first image through the first camera and obtain a second image through the second camera, obtain depth information of a pixel included in the first image, identify, based on the depth information, a first layer image and a second layer image from the first image, inpaint, based on the first image and the second image, at least a part of the first layer image, and generate, based on the second layer image and the inpainted first layer image, a three-dimensional (3D) image including a plurality of layers.

A second field of view (FOV) of the second camera may be larger than a first FOV of the first camera, and a region corresponding to the first image may be included in a region corresponding to the second image.

The at least one processor may be further configured to execute the one or more instructions to preprocess the second image by cropping the second image or warping an axis of the second image.

The at least one processor may be further configured to execute the one or more instructions to obtain depth information of a first pixel, based on a parallax between the first pixel included in the first image and a second pixel included in the second image and corresponding to the first pixel.

The at least one processor may be further configured to execute the one or more instructions to identify an image region corresponding to a target object as the second layer image, and identify a region of the first image excluding the second layer image as the first layer image.

The at least one processor may be further configured to execute the one or more instructions to: determine an inpainting region to be inpainted in the first layer image, determine an image, from among the first image and the second image, to be used for determining a pixel value of a specific pixel in the inpainting region, and determine the pixel value of the specific pixel, based on the determined image.

The at least one processor may be further configured to execute the one or more instructions to: identify an object image corresponding to the specific pixel, based on the corresponding object image being entirely included in the first image, determine the first image as the image to be used for determining the pixel value of the specific pixel, and based on the corresponding object image not being entirely included in the first image, determine the second image as the image to be used for determining the pixel value of the specific pixel.

The 3D image may include a first layer and a second layer, and the at least one processor may be further configured to execute the one or more instructions to render the inpainted first layer image on the first layer and render the second layer image on the second layer.

According to an aspect of the disclosure, a non-transitory computer-readable recording medium may have recorded thereon a program that is executable by a computer to perform for performing the method of generating a 3D image.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a flowchart of a method, performed by an electronic device, of generating a 3D image by using a plurality of cameras according to an embodiment of the disclosure;

FIG. 7A is a diagram illustrating an operation of an electronic device identifying a foreground image and the background image according to an embodiment of the disclosure;

FIG. 7B is a diagram illustrating an operation of an electronic device identifying a first layer image and a second layer image according to an embodiment of the disclosure;

MODE OF DISCLOSURE

Figure 1:
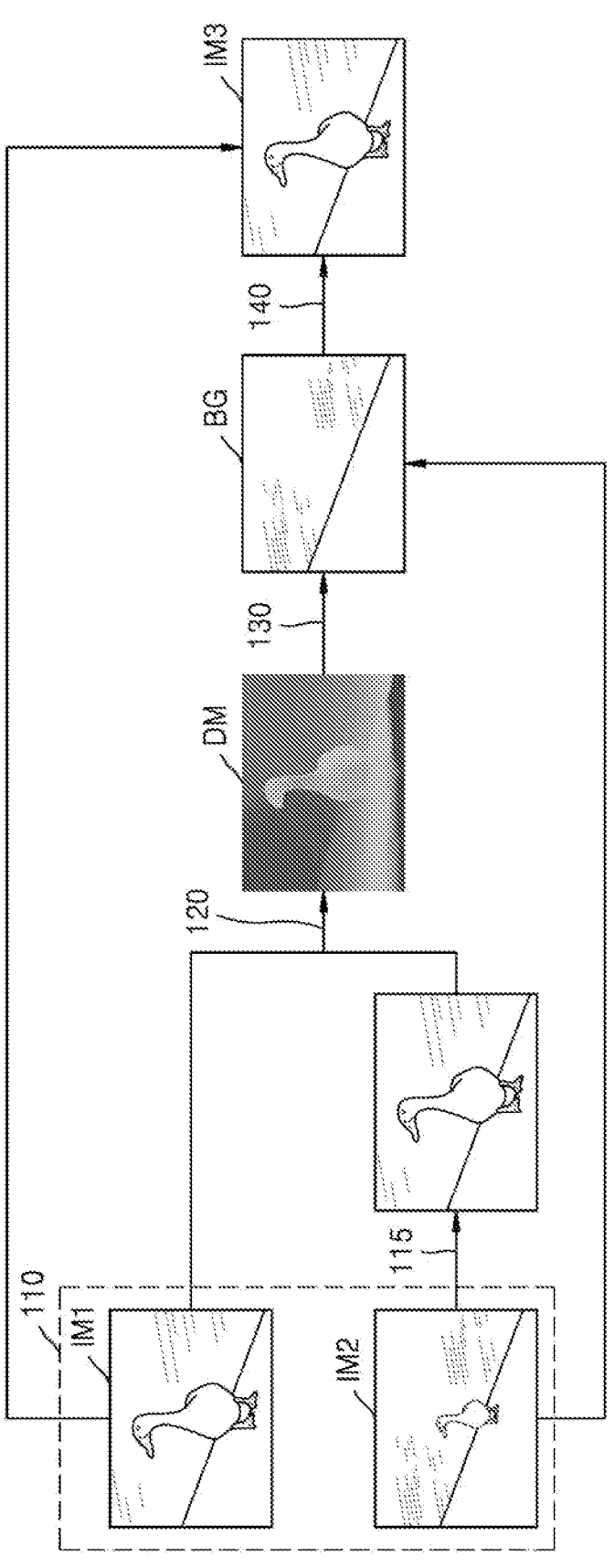
FIG. 1 is a schematic diagram of a method, performed by an electronic device, of generating a three-dimensional (3D) image by using a plurality of cameras according to an embodiment of the disclosure.

Embodiments of the disclosure will be described in detail with reference to the accompanying drawings so that those of ordinary skill in the art may easily implement the embodiments of the disclosure. However, the disclosure may be embodied in many different forms and should not be construed as being limited to the embodiments set forth herein. Also, portions irrelevant to the description of the disclosure will be omitted in the drawings for a clear description of the disclosure, and like reference numerals will denote like elements throughout the specification.

The terms used herein are those general terms currently widely used in the art in consideration of functions in the disclosure, but the terms may vary according to the intentions of those of ordinary skill in the art, precedents, or new technology in the art. Also, in some cases, there may be terms that are optionally selected by the applicant, and the meanings thereof will be described in detail in the corresponding portions of the disclosure. Thus, the terms used herein should be understood not as simple names but based on the meanings of the terms and the overall description of the disclosure.

Throughout the disclosure, the expression "at least one of a, b or c" indicates only a, only b, only c, both a and b, both a and c, both b and c, or all of a, b, and c.

As used herein, the singular forms "a," "an," and "the" may include the plural forms as well, unless the context clearly indicates otherwise. Unless otherwise defined, all terms (including technical or scientific terms) used herein may have the same meanings as commonly understood by those of ordinary skill in the art of the disclosure.

Throughout the disclosure, when something is referred to as "including" an element, one or more other elements may be further included unless specified otherwise. Also, as used herein, terms such as "units" and "modules" may refer to units that perform at least one function or operation, and the units may be implemented as hardware or software or a combination of hardware and software.

Throughout the specification, when an element is referred to as being "connected" to another element, it may be "directly connected" to the other element or may be "electrically connected" to the other element with one or more intervening elements therebetween. In addition, the terms "comprises" and/or "comprising" or "includes" and/or "including" when used in this specification, specify the presence of stated elements, but do not preclude the presence or addition of one or more other elements.

The expression "configured to (or set to)" used herein may be used interchangeably with, for example, "suitable for", "having the capacity to", "designed to", "adapted to", "made to", or "capable of", according to situations. The expression "configured to (or set to)" may not only necessarily refer to "specifically designed to" in terms of hardware. Instead, in some situations, the expression "system configured to" may mean that the system is "capable of" along with other devices or components. For example, "a processor configured to (or set to) perform A, B, and C" may refer to a dedicated processor (e.g., an embedded processor) for performing a corresponding operation, or a general-purpose processor (e.g., a central processing unit (CPU) or an application processor) capable of performing a corresponding operation by executing one or more software programs stored in a memory.

A function related to artificial intelligence (AI) according to the disclosure may be performed by a processor and a memory. The processor may include one processor or a plurality of processors. In this regard, one processor or the plurality of processors may include a general-purpose processor, such as a CPU, an application processor (AP), a digital signal processor (DSP), etc., a graphic-dedicated processor, such as a GPU, a vision processing unit (VPU), etc., or an AI-dedicated processor, such as a neural processing unit (NPU). One processor or the plurality of processors may process data according to a predefined operation rule or AI model stored in the memory. When one processor or the plurality of processors include an AI-dedicated processor, the AI-dedicated processor may be designed to have a hardware structure specialized for processing a specific AI model.

The predefined operation rule or AI model may be made through training. Herein, when the AI model is made through training, it may mean that a basic AI model (or a deep learning model) is trained based on a learning algo-rithm by using multiple training datasets, such that the predefined operation rule or AI model set to execute desired characteristics (or purpose) is made. Such training may be performed by a device on which AI according to the disclosure is implemented, or by a separate server and/or system. Examples of a learning algorithm may include, but not limited to, supervised learning, unsupervised learning, semi-supervised learning, or reinforcement learning.

The artificial intelligence model (or the deep learning model) may include a plurality of neural network layers. Each of the plurality of neural network layers may have a plurality of weight values, and perform a neural network operation through an operation between an operation result of a previous layer and the plurality of weight values. The plurality of weight values of the plurality of neural network layers may be optimized by a training result of the AI model. For example, the plurality of weight values may be updated to reduce or minimize a loss value or a cost value obtained in the AI model during a training process. Examples of the AI neural network may include, but not limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), and a deep Q-network.

In the disclosure, a 'field of view (FOV)' indicates a region of an image or video taken with a camera. For example, the 'FOV of the camera' may indicate an angle that may be captured by the camera through the lens, and the 'FOV of the image' may indicate the FOV of the camera using the image as an imaging surface. The FOV may also be referred to as degree of FOV (DFOV). The region of the image or video photographed by a camera may indicate a region of the image or video displayed within a display screen area.

In the disclosure, a 'foreground image' indicates an image of a target object included in the image. A specific image may include at least one foreground image. In an embodiment of the disclosure, one foreground image may correspond to a single target object or a plurality target objects. In the foreground image, pixels in a region corresponding to a background image may not have pixel values, may have pixel values of the corresponding background image, or may have inpainted pixel values. In the disclosure, a 'background image' indicates a region excluding at least one foreground image from a specific image. In the background image, pixels in a region corresponding to a foreground image may not have pixel values, may have pixel values of the corresponding foreground image, or may have inpainted pixel values.

In the disclosure, a 3D image may include a plurality of layers. A 'layer' represents a layer on which an image is rendered graphically. The 3D image may be generated by overlapping rendered images on a plurality of transparent layers.

Hereinafter, certain embodiments of the disclosure will be described in detail with reference to the accompanying drawings.

FIG. 1 is a schematic diagram of a method, performed by an electronic device, of generating a 3D image by using a plurality of cameras according to an embodiment of the disclosure.

In operation 110, the electronic device may obtain input images IM1 and IM2 through the plurality of cameras included in the electronic device. The electronic device may include a first camera and a second camera having different fields of view (FOVs). The electronic device may obtain the first image IM1 through the first camera and obtain the second image IM2 through the second camera. The first image IM1 and the second image IM2 may be 2D images. In an embodiment of the disclosure, the second camera may have a wider FOV than that of the first camera. In this case, the second image IM2 obtained through the second camera may include information corresponding to a wider region than the first image IM1 obtained through the first camera. For example, the region corresponding to the first image IM1 obtained through the first camera may be included in the region corresponding to the second image IM2 obtained through the second camera. For example, the first image IM1 may correspond to an enlarged image of a part of the second image IM2. The relationship between the FOV of the first image IM1 and the FOV of the second image IM2 according to an embodiment of the disclosure is described in more detail with reference to FIG. 5 below.

The electronic device according to an embodiment of the disclosure may generate a 3D image IM3 based on the first image IM1 and the second image IM2.

In an embodiment of the disclosure, the FOV of the 3D image IM3 generated by the electronic device may be smaller than or equal to the FOV of the first image IM1. For example, when the FOV of the first image IM1 is $a_1$ and the FOV of the second image IM2 is $a_2$, a FOV $a_3$ of the 3D image IM3 generated based on the first image IM1 and the second image IM2 may satisfy $a_3 \leq a_1 \leq a_2$.

In an embodiment of the disclosure, the FOV of the 3D image IM3 generated by the electronic device may be greater than or equal to the FOV of the first image IM1 and smaller than or equal to the FOV of the second image IM2. For example, when the FOV of the first image IM1 is $a_1$ and the FOV of the second image IM2 is $a_2$, the FOV $a_3$ of the 3D image IM3 generated based on the first image IM1 and the second image IM2 may satisfy $a_1 \leq a_3 \leq a_2$.

In operation 115, the electronic device may preprocess the second image IM2 based on the FOV $a_3$ of the 3D image IM3 to be generated. An operation of preprocessing the second image IM2 may include cropping the second image IM2 and warping an image axis of the second image IM2 in accordance with the FOV $a_3$.

In an embodiment of the disclosure, the electronic device may also perform a preprocessing operation on the first image IM1. The operation of preprocessing the first image IM1 may also include the operation of cropping the first image IM1 and the operation of warping an image axis of the first image IM1 based on the FOV $a_3$ of the 3D image IM3 to be generated. The preprocessed second image IM2 may have the same image axis as that of the preprocessed first image IM1 and may correspond to an image of the same region as that of the preprocessed first image IM1. For example, all pixels of the preprocessed second image IM2 may correspond to all pixels included in the preprocessed first image IM1 one-to-one. For example, the preprocessed first image IM1 and the preprocessed second image IM2 may include images corresponding to the same object, and object images included in the preprocessed first image IM1 and the preprocessed second image IM2 may have the same or similar size.

In an embodiment of the disclosure, the FOV $a_3$ of the 3D image IM3 to be generated by the electronic device may be set to $a_1$, which is the FOV of the first image IM1 ($a_1 = a_3$). In this case, the electronic device may preprocess the second image IM2 by warping the image axis of the second image IM2 to correspond to the image axis of the first image IM1, and cropping and enlarging the second image IM2.

In subsequent operations, a case where the FOV $a_3$ of the 3D image IM3 to be generated by the electronic device is the FOV $a_1$ of the first image IM1 ($a_1 = a_3$) is described. In an embodiment of the disclosure, when the FOV $a_3$ of the 3D image IM3 to be generated by the electronic device is not the FOV $a_1$ of the first image IM1, the electronic device may preprocess the first image IM1 based on the FOV $a_3$ of the 3D image IM3 to be generated (for example, cropping the first image IM1 or warping the image axis of the first image IM1), and then apply subsequent operations to the preprocessed first image IM1.

In operation 120, the electronic device may obtain depth information of a pixel included in the first image IM1.

In an embodiment of the disclosure, the operation of obtaining the depth information of the pixel included in the first image IM1 may use an artificial intelligence model trained to output a depth map DM including depth information of pixels included in the first image IM1 by using the first image IM1 as an input value.

In an embodiment of the disclosure, in operation 120, the electronic device may obtain the depth information of the pixel included in the first image IM1 based on a parallax between the first image IM1 and the second image IM2. For example, the electronic device may obtain depth information of a first pixel included in the first image IM1 based on a parallax between the first pixel and a second pixel included in the second image IM2 and corresponding to the first pixel.

In an embodiment of the disclosure, the depth map DM calculated based on the parallax between the first image IM1 and the second image IM2 may include a depth value with higher accuracy than that of a depth map estimated by applying an artificial intelligence model to the first image IM. Therefore, the method of generating the 3D image IM3 using a plurality of cameras (a plurality of images captured at different locations) according to an embodiment of the disclosure may obtain the depth map DM with high accuracy, compared to generating the 3D image IM3 by using a single camera (single image).

The operation of the electronic device generating the depth map DM including the depth information of the pixels included in the first image IM1 based on the first image IM1 and the second image IM2 according to an embodiment of the disclosure is described in more detail with reference to FIG. 6 below.

In operation 130, the electronic device may identify a foreground image FG and a background image BG from the first image IM1 based on the depth information included in the depth map DM. In an embodiment of the disclosure, the background image BG may correspond to a first layer image, and the foreground image FG may correspond to a second layer image. For example, the first layer image may include the background image BG, and the second layer image may include the foreground image FG. The electronic device may inpaint at least a part of the first layer image including the background image BG based on the first image IM1 and the second image IM2.

In an embodiment of the disclosure, the operation of the electronic device distinguishing the foreground image FG and the background image BG from the first image IM1 based on the depth information may include identifying an image region corresponding to a target object to the foreground image FG and identifying a region of the first image IM1 excluding the foreground image FG as the background image BG. For example, the target object may indicate an object to be rendered on a front layer when the 3D image IM3 is generated. Referring to FIG. 1, the target object may be a duck, the foreground image FG may correspond to an image region corresponding to the duck in the first image IM1, and the background image BG may correspond to a region (e.g., land, water, etc.) of the first image IM1 excluding a duck image.

On the depth map DM, a depth value may abruptly change or a discontinuous depth value may appear at a boundary part of images corresponding to different objects. Accordingly, by referring to the depth map DM corresponding to the first image IM1, the electronic device may obtain information related to edges of objects included in the first image IM1. In an embodiment of the disclosure, the electronic device may distinguish the foreground image FG and the background image BG from the first image IM1 based on the depth map DM corresponding to the first image IM1.

The operation of the electronic device identifying the foreground image FG and the background image BG from the first image IM1 according to an embodiment of the disclosure is described in more detail with reference to FIG. 7 below.

In an embodiment of the disclosure, the operation of inpainting at least a part of the first layer image including the background image BG based on the first image IM1 and the second image IM2 may include determining an inpainting region to be inpainted in the first layer image, with respect to a specific pixel in the inpainting region, determining an image to be used for determining a pixel value of the specific pixel from among the first image IM1 and the second image IM2, and determining the pixel value corresponding to the specific pixel based on the determined image.

In an embodiment of the disclosure, the inpainting region may include at least a part of a region on the first layer image corresponding to the second layer image. In an embodiment of the disclosure, the inpainting region may be determined based on the depth map DM corresponding to the first image IM1. For example, when a difference between the depth values of the first layer image and the second layer image on the depth map DM is great, the inpainting region may be widened, and when the difference between the depth values of the first layer image and the second layer image is small, the inpainting region may be narrowed. The operation of the electronic device determining the inpainting region based on the depth map DM according to an embodiment of the disclosure is described in more detail with reference to FIG. 8 below.

In an embodiment of the disclosure, the electronic device may determine the image to be used for determining the pixel value of a corresponding pixel from among the first image IM1 and the second image IM2 based on a relative location of the specific pixel inside the inpainting region. For example, the inpainting region may be regarded as having a boundary line (outer boundary line) on the background image BG and a boundary line (inner boundary line) on a region in which inpainting is not performed. In this regard, when the specific pixel of which a pixel value is to be determined is closer to the outer boundary line, the electronic device may determine the second image IM2 as the image to be used for determining the pixel value, and when the specific pixel is closer to the inner boundary line, the electronic device may determine the first image IM1 as the image to be used for determining the pixel value. The operation of the electronic device determining the image to be used for determining the pixel value of the corresponding pixel from among the first image IM1 and the second image IM2 based on the relative location of the specific pixel inside the inpainting region according to an embodiment of the disclosure is described in more detail with reference to FIG. 9 below.

In an embodiment of the disclosure, the operation of the electronic device determining the image to be used for determining the pixel value of the corresponding pixel from among the first image IM1 and the second image IM2 with respect to the specific pixel in the inpainting region may include identifying an object image corresponding to the pixel, when the corresponding object image is entirely included in the first image IM1, determining the first image IM1 as the image to be used for determining the pixel value of the corresponding pixel, and, when the corresponding object image is not entirely included in the first image IM1, determining the second image IM2 as the image to be used for determining the pixel value of the corresponding pixel.

The operation of the electronic device inpainting the first layer image based on the first image IM1 and the second image IM2 according to an embodiment of the disclosure is described in more detail with reference to FIGS. 8 and 9 below.

In operation 140, the electronic device may generate the 3D image IM3 including a plurality of layers, based on the second layer image and the inpainted first layer image. In an embodiment of the disclosure, the 3D image IM3 may include a plurality of layers. For example, the 3D image IM3 may include a first layer and a second layer. The operation of the electronic device generating the 3D image IM3 may include rendering the inpainted first layer image on the first layer and rendering the second layer image on the second layer. The first layer may have a greater depth value from the electronic device than that of the second layer. The operation of the electronic device generating the 3D image IM3 including the plurality of layers, based on the second layer image and the inpainted first layer image according to an embodiment of the disclosure is described in more detail with reference to FIG. 10 below.

In an embodiment of the disclosure, the 3D image IM3 may be generated from the plurality of images obtained by using the plurality of cameras having different FOVs, and thus, more pixel information may be used for the operation of inpainting an image, and artifacts occurring at the boundary part between the foreground image FG and the background image BG may be reduced, and thus, a realistic 3D image IM3 may be generated.

FIG. 2 is a flowchart of a method, performed by an electronic device, of generating a 3D image by using a plurality of cameras according to an embodiment of the disclosure.

In operation S210, the electronic device obtains a first image and a second image. Operation S210 may correspond to operation 110 of FIG. 1. In an embodiment of the disclosure, the electronic device may include a first camera and a second camera having different FOVs. The electronic device may obtain the first image through the first camera and obtain the second image through the second camera. The first image and the second image may be two-dimensional (2D) images. In an embodiment of the disclosure, the second camera may have a wider FOV than that of the first camera. The relationship between the FOV of the first image and the FOV of the second image according to an embodiment of the disclosure is described in more detail with reference to FIG. 5 below.

In an embodiment of the disclosure, an FOV of the 3D image to be generated by the electronic device may be set to be the same as the FOV of the first image. In this case, the electronic device may preprocess the second image by warping an image axis of the second image to correspond to the first image, and cropping and enlarging the second image. The preprocessed second image may have the same image axis as that of the first image and may correspond to an image of the same region as that of the first image. For example, all pixels in the preprocessed second image may correspond to all pixels included in the first image one-to-one.

In subsequent operations, a case where the FOV of the 3D image to be generated by the electronic device is the same as the FOV of the first image is described. In an embodiment of the disclosure, when the FOV of the 3D image to be generated by the electronic device is not the FOV of the first image, the electronic device may preprocess the first image based on the FOV of the 3D image to be generated, and then apply subsequent operations to the preprocessed first image.

In operation S220, the electronic device obtains depth information of a pixel included in the first image. Operation S220 may correspond to operation 120 of FIG. 1. In an embodiment of the disclosure, the operation of obtaining depth information of pixels included in the first image may use an artificial intelligence model trained to output a depth map including the depth information of pixels included in the first image. In an embodiment of the disclosure, the operation of obtaining the depth information of the pixels included in the first image may use a parallax between the first image and the second image. For example, the electronic device may obtain depth information of a first pixel included in the first image based on the parallax between the first pixel and a second pixel included in the second image and corresponding to the first pixel. The operation of obtaining the depth information of pixels included in the first image using the parallax between the first image and the second image may use triangulation based on relative location information of the first camera and the second camera.

The operation of the electronic device obtaining the depth map including the depth information of pixels included in the first image based on the first image and the second image according to an embodiment of the disclosure is described in more detail with reference to FIG. 6 below.

Operations S230 and S240 may correspond to operation 130 of FIG. 1. In operation S230, the electronic device identifies the first layer image and the second layer image from the first image based on the depth information of the pixels included in the first image. In an embodiment of the disclosure, the first layer image may include a background image, and the second layer image may include a foreground image. For example, the electronic device may distinguish the foreground image and the background image from the first image, and may identify the first layer image and the second layer image based on the distinguished foreground image and background image. In an embodiment of the disclosure, the operation of the electronic device distinguishing the foreground image and the background image from the first image may include identifying an image region corresponding to a target object as the foreground image, and identifying a region of the first image excluding the foreground image as the background image. For example, the target object may indicate an object to be rendered on a front layer when the 3D image is generated. The operation of the electronic device identifying the foreground image and the background image from the first image according to an embodiment of the disclosure is described in more detail with reference to FIG. 7 below.

In operation S240, the electronic device inpaints at least a part of the first layer image, based on the first image and the second image. In an embodiment of the disclosure, the operation of inpainting the at least a part of the first layer image, on the first image and the second image may include determining an inpainting region to be inpainted in the first layer image, with respect to a specific pixel inside the inpainting region, determining an image to be used for determining a pixel value of the specific pixel from among the first image and the second image, and determining the pixel value corresponding to the specific pixel based on the determined image.

In an embodiment of the disclosure, the electronic device may inpaint at least a part of the first layer image and the second layer image, based on the first image and the second image. For example, the electronic device may inpaint at least a part of the first layer image, inpaint at least a part of the second layer image, or inpaint at least a part of the first layer image and at least a part of the second layer image. The operation of inpainting at least a part of the second layer image may be performed similarly to the operation of inpainting at least a part of the first layer image. For example, the operation of inpainting at least a part of the second layer image may include determining an inpainting region to be inpainted in the second layer image, with respect to a specific pixel in the inpainting region, determining an image to be used for determining a pixel value of the specific pixel from among the first image and the second image, and determining the pixel value corresponding to the specific pixel based on the determined image. Hereinafter, a case where the electronic device inpaints at least a part of the first layer image, based on the first image and the second image is described.

In an embodiment of the disclosure, the inpainting region may include at least a part of a region on the first layer image corresponding to the foreground image. The inpainting region may be determined based on a depth map corresponding to the first image. For example, on the depth map, when a difference between the depth values of the foreground image and the background image is great, the inpainting region may be widened, and when the difference between the depth values of the foreground image and the background image is small, the inpainting region may be narrowed. The operation of the electronic device determining the inpainting region based on the depth map according to an embodiment of the disclosure is described in more detail with reference to FIG. 8 below.

In an embodiment of the disclosure, the electronic device may determine the image to be used for determining a pixel value of a corresponding pixel from among the first image and the second image, based on a relative location of the specific pixel inside the inpainting region. For example, the inpainting region may have a boundary line (outer boundary line) on the background image BG and a boundary line (inner boundary line) on a region in which inpainting is not performed. In this regard, when the specific pixel of which a pixel value is to be determined is closer to the outer boundary line, the electronic device may determine the second image as the image to be used for determining the pixel value, and when the specific pixel is closer to the inner boundary line, the electronic device may determine the first image as the image to be used for determining the pixel value. The operation of the electronic device determining the image to be used for determining the pixel value of the corresponding pixel from among the first image and the second image based on the relative location of the specific pixel inside the inpainting region according to an embodiment of the disclosure is described in more detail with reference to FIG. 9 below.

In an embodiment of the disclosure, the electronic device may identify an object image corresponding to a specific pixel in the inpainting region, and when the corresponding object image is entirely included in the first image, determine the pixel value of the corresponding pixel using the first image. Also, when the corresponding object image is not entirely included in the first image, the electronic device may determine the pixel value of the corresponding pixel using the second image including more information than that of the first image. The operation of the electronic device inpainting the first layer image, based on the first image and the second image according to an embodiment of the disclosure is described in more detail with reference to FIGS. 8 and 9 below.

In operation S250, the electronic device generates a 3D image including a plurality of layers, based on the second layer image and the inpainted first layer image. Operation S250 may correspond to operation 140 of FIG. 1. In an embodiment of the disclosure, the generated 3D image may include a first layer and a second layer. The first layer may have a greater depth value from the electronic device than that of the second layer. The operation of the electronic device generating the 3D image may include rendering the inpainted first layer image on the first layer and rendering the second layer image on the second layer. The operation of the electronic device generating the 3D image including the plurality of layers, based on the second layer image and the inpainted first layer image according to an embodiment of the disclosure is described in more detail with reference to FIG. 10 below.

Figure 3:
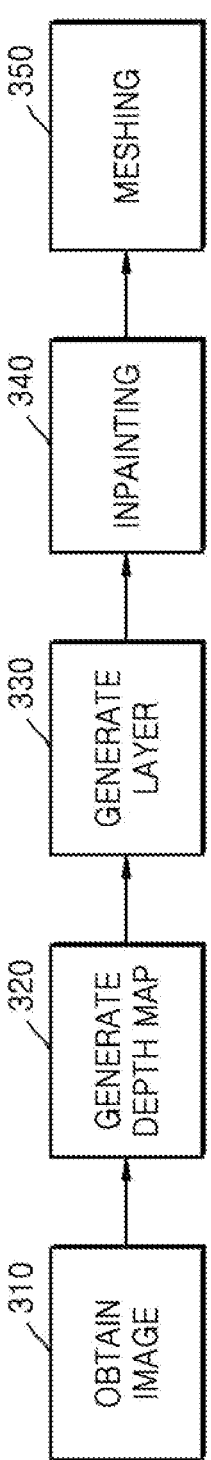
FIG. 3 is a diagram illustrating an operation of an electronic device generating a 3D image from at least one two-dimensional (2D) image according to an embodiment of the disclosure.

FIG. 3 is a diagram illustrating an operation of an electronic device generating a 3D image from at least one 2D image according to an embodiment of the disclosure.

The 3D image according to an embodiment of the disclosure may be generated by generating a depth map through depth estimation, generating a layer of the 3D image by using the generated depth map, inpainting a pixel value of at least a part of the 3D image, and meshing the 3D data.

In operation 310, the electronic device may obtain at least one 2D image. The electronic device may capture the 2D image of a real region within a camera FOV through a camera.

In operation 320, the electronic device may generate the depth map of a region corresponding to the 3D image to be generated. The depth map may include a depth value corresponding to each pixel unit. In an embodiment of the disclosure, the electronic device may generate an accurate depth map by using two cameras disposed at different locations, compared to using a single camera. For example, the electronic device may include a first camera disposed at a first location and a second camera disposed at a second location. Each of the first image captured by the first camera and the second image captured by the second camera may be a 2D image.

In an embodiment of the disclosure, the electronic device may attempt to convert a first 2D image into a 3D image. In this case, the electronic device may generate the depth map from only the first image by using an artificial intelligence model trained to output depth values of pixels included in the first image using the first image as an input value. Also, the electronic device may obtain the depth map corresponding to the first image based on a parallax between the first image and the second image. For example, the electronic device may obtain 3D depth information of the first pixel based on coordinates of a specific first pixel of the first image, coordinates of a second pixel corresponding to the first pixel in the second image, an FOV of the first camera, an FOV of the second camera, and relative location information of the first camera and the second camera. A depth map calculated through two cameras disposed at different locations may include a depth value with higher accuracy than that of a depth map estimated through a single camera.

In operation 330, the electronic device may generate the layer of the 3D image. The 3D image may include two or more layers. The two or more layers may be configured as mutually parallel planes. The layer of the 3D image may be generated based on depth information about each pixel of the first image. The number of layers may affect the calculation time for converting the 2D image into the 3D image. In an embodiment of the disclosure, the 3D image may include two layers, wherein a second layer image including a foreground image may be rendered on a front layer from among the two layers, and a first layer image including a background image may be rendered on a rear layer.

In operation 340, the electronic device may perform an inpainting operation. The inpainting operation refers to an operation of determining a pixel value of a pixel of which value is not specified. When a 2D image displayed on one layer is reconstructed into a 3D image having a plurality of layers, a pixel value of a pixel is omitted in the rear layer separated into the front layer. In this case, in order to determine the omitted pixel value of the pixel, information of pixels around the pixel may be used. In an embodiment of the disclosure, the inpainting operation may be performed on the first layer image rendered on the rear layer. According to an embodiment of the disclosure, the inpainting operation may also be performed on at least a part of the second layer image rendered on the front layer.

In an embodiment of the disclosure, the electronic device may perform an accurate inpainting operation by using two cameras having different FOVs. For example, the electronic device may obtain an image of a wider background region by using a camera (e.g., a wide-angle camera or an ultra-wide-angle camera) having a wide FOV including a region of the 3D image to be generated. When at least a part of the 3D image is inpainted using the image having a wide FOV, the electronic device may obtain a pixel value which is further identical to reality.

For example, the electronic device may include a first camera having a first FOV and a second camera having a second FOV. The second FOV may be greater than the first FOV. A region photographed by the second camera may include a region photographed by the first camera. The electronic device may convert the first image captured by the first camera into a 3D image. In this case, the electronic device may inpaint the first image using the second image of which a photographed region is larger than that of the first image, thereby more accurately inpainting a background image that is not captured by overlapping the foreground image in the first image.

In operation 350, the 3D image may be generated through a meshing operation. For example, the second layer image including the foreground image may be rendered on the second layer as it is. In an embodiment of the disclosure, the second layer image may be reconstructed into a 3D representation and rendered on the second layer. In an embodiment of the disclosure, the second layer image may be rendered on two or more layers. The inpainted first layer image may be rendered on the first layer. When the first layer and the second layer are viewed vertically, the foreground image may overlap with the inpainted background region of the first layer image.

Figure 4:
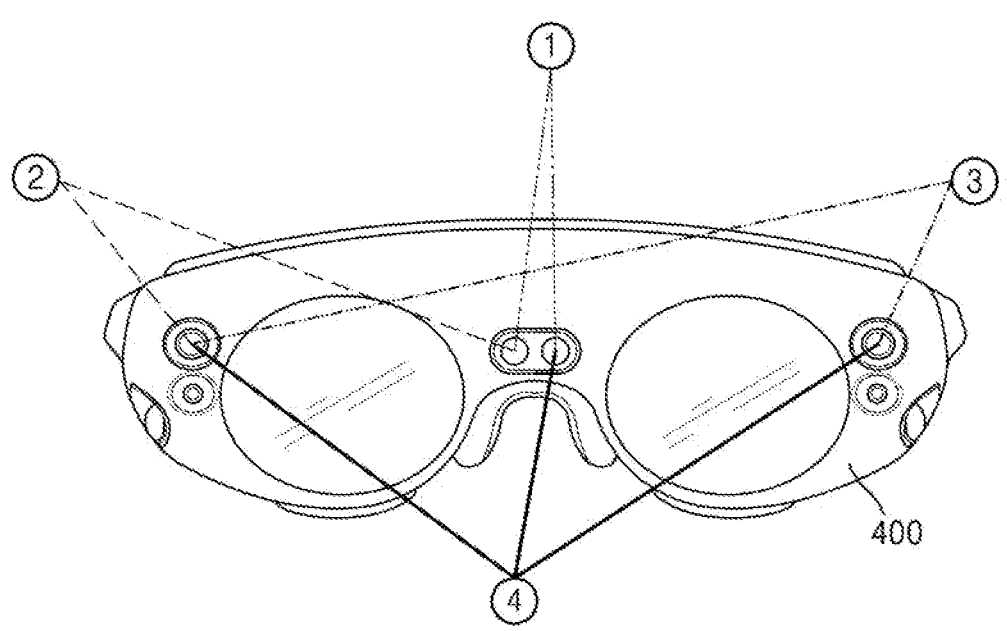
FIG. 4 is a diagram illustrating a plurality of cameras included in an electronic device according to an embodiment of the disclosure.

FIG. 4 is a diagram illustrating a plurality of cameras included in an electronic device 400 according to an embodiment of the disclosure.

The electronic device 400 according to an embodiment of the disclosure may include an augmented reality (AR)

device. The AR device may include glasses-shaped AR glasses worn by the user on the face, a head-mounted display (HMD), a virtual reality headset (VRH), or an AR helmet worn on the head, etc.

In an embodiment of the disclosure, the electronic device 400 may include one or more cameras capable of capturing images and videos therearound. Each of the one or more cameras may capture an image corresponding to an FOV of the corresponding camera or measure a distance to an object included in the FOV. In an embodiment of the disclosure, the camera may be used for head tracking and space recognition. Also, the camera may recognize the movement of a user wearing the electronic device 400.

In an embodiment of the disclosure, the camera included in the electronic device 400 may be used to obtain an image corresponding to a user's field of view, for example, a 3D image. The electronic device 400 may identify an external object included in at least a part corresponding to a region determined by the user's field of view among image information related to a real space obtained through an outward facing camera. The electronic device 400 may output the 3D image related to an external object identified at least in part through a display region (display) of the electronic device 400.

In an embodiment of the disclosure, the electronic device 400 may include a plurality of cameras. Each of the cameras included in the electronic device 400 may obtain a 2D image. The electronic device 400 may obtain a 3D image of a front region or an object by using the plurality of cameras. For example, the electronic device 400 may obtain the 3D image through two or more cameras among the plurality of cameras included in the electronic device 400.

Referring to FIG. 4, in an embodiment of the disclosure, the HMD type electronic device 400 may include two cameras disposed between the user's eyes and two cameras disposed outside the user's eyes. In Example 1, the electronic device 400 may obtain a 3D image of the front region by using the two cameras disposed between the user's eyes. In Example 2, the electronic device 400 may obtain a 3D image of the front region by using one of the cameras disposed between the user's eyes and one of the cameras disposed outside the user's eyes. In Example 3, the electronic device 400 may obtain a 3D image of the front region by using the two cameras disposed outside the user's eyes. In Example 4, the electronic device 400 may obtain a 3D image of the front region by using one of the cameras disposed between the user's eyes and the two cameras disposed outside the user's eyes. The various cameras used by the electronic device 400 to generate the 3D image may have different FOVs or may have photographing areas overlapping in at least some regions. In Example 4 in which three cameras are used to obtain the 3D image, artifacts in the generated 3D image may be less than in Examples 1 to 3 in which two cameras are used.

The electronic device 400 according to an embodiment of the disclosure is not limited to the configuration described above, and may include various number of cameras having various FOVs at various locations. For example, the method of generating a 3D image by using a plurality of cameras, according to an embodiment of the disclosure, may also be applied to a mobile phone including a telephoto camera, a wide-angle camera, and an ultra-wide-angle camera. In addition, various electronic devices in which a plurality of cameras, such as AR glasses, an HMD, a smart phone, etc. are mounted may generate a 3D image through various combinations of the plurality of cameras.

Figure 5A:
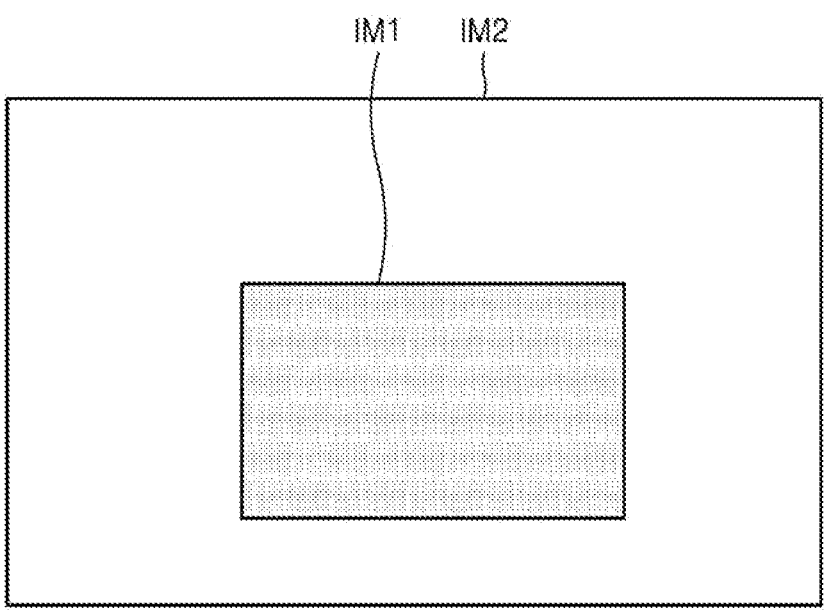
FIG. 5A is a diagram illustrating field of view (FOVs) of a plurality of cameras included in an electronic device according to an embodiment of the disclosure.
Figure 5B:
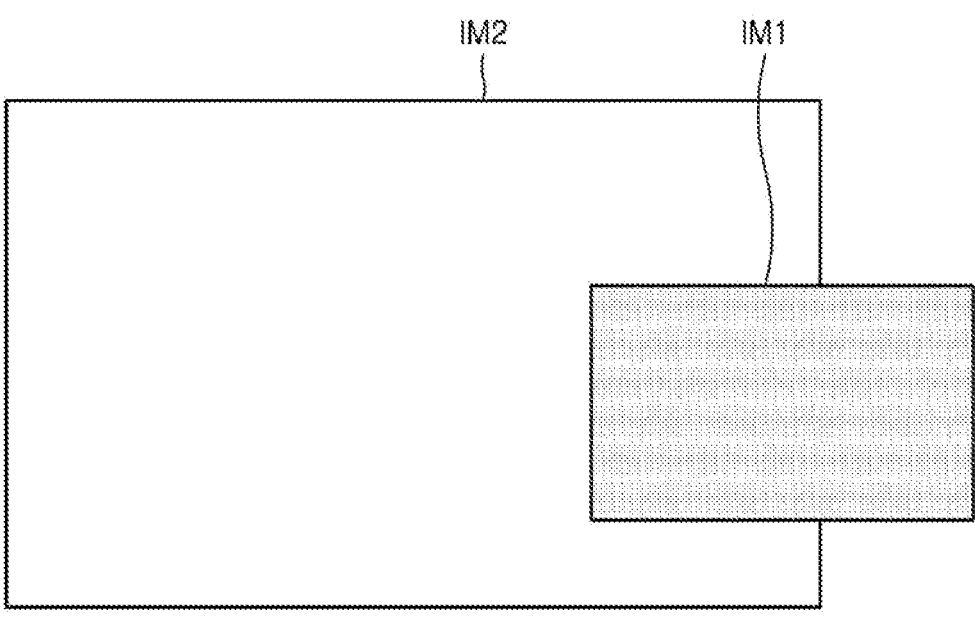
FIG. 5B is a diagram illustrating FOVs of a plurality of cameras included in an electronic device according to an embodiment of the disclosure.

FIGS. 5A and 5B are diagrams illustrating FOVs of a plurality of cameras included in an electronic device according to an embodiment of the disclosure.

A plurality of cameras used by the electronic device to generate a 3D image may have different FOVs or may have photographing areas overlapping in at least some regions.

In an embodiment of the disclosure, the electronic device may use two cameras (a first camera and a second camera) to generate the 3D image. The first image IM1 may be obtained through the first camera, and the second image IM2 may be obtained through the second camera. An image obtained through one camera (the first camera or the second camera) may be a 2D image, and therefore, the first image IM1 and the second image IM2 may be 2D planar images.

The FOV of a camera may indicate a 'region in which the field of view of a camera lens reaches'. The FOV may be expressed as a DFOV. The DFOV may include a horizontal FOV (HFOV) and a vertical FOV (VFOV). The HFOV may be an angle from the left end to the right end of a screen photographed by the camera that is fixed. The VFOV may be an angle from the top end to the bottom end of the screen photographed by the camera that is fixed. The viewing angle DFOV may mean an angle from an upper left end to a lower right end of a screen that may be photographed when the camera is fixed. For example, a camera having a DFOV of 90 degrees may photograph a front region of 90 degrees as an image.

The DFOV of the camera may have a constant value. Accordingly, the area photographable by the camera may increase as the distance from the camera increases, and may decrease as the distance from the camera decreases. An object located close to the camera may be displayed larger on the captured image, and an object located far from the camera may be displayed smaller on the captured mage.

The camera may perform a zoom in or zoom out operation. The zoom in operation may correspond to an operation of narrowing the DFOV of the camera, and the zoom out operation may correspond to an operation of widening the DFOV of the camera. The zoom in and zoom out operations of the camera may be performed within the range of a minimum DFOV to a maximum DFOV.

When the FOV of the camera is wide, photographing of a wider region may be possible. In an embodiment of the disclosure, the second camera may have a wider FOV compared to the first camera, and the second image IM2 captured by the second camera may include a wide region compared to the first image IM1 captured by the first camera.

Referring to FIG. 5A, the second image IM2 captured by a camera having a wide FOV may include the first image IM1 captured by a camera having a narrow FOV. According to an embodiment of the disclosure, one image 'including' another image indicates a relationship in which one image includes a part corresponding to the other image when the two images have the same scale. Referring to FIG. 5A, when the second image IM2 obtained through the second camera is enlarged to have the same scale as that of the first image IM1, the region corresponding to the first image IM1 may be included in the enlarged image IM2.

Referring to FIG. 5B, the first image IM1 may overlap with the second image IM2 in at least a partial region. In an embodiment of the disclosure, the region photographed by the camera may be determined based on a location in which the corresponding camera is disposed and an FOV of the corresponding camera. The first camera and the second camera may have photographing regions based on a location in which each camera is disposed on the electronic device and an FOV of each camera. In an embodiment of the disclosure, two cameras disposed at different locations may have an overlapping photographing region in some regions, and the first image IM1 and the second image IM2 obtained through the two cameras may overlap in some regions. Although the FOV of the second image IM2 is wider than that of the first image IM1 in FIG. 5B, the plurality of cameras according to an embodiment of the disclosure may have the same FOV.

Figure 6:
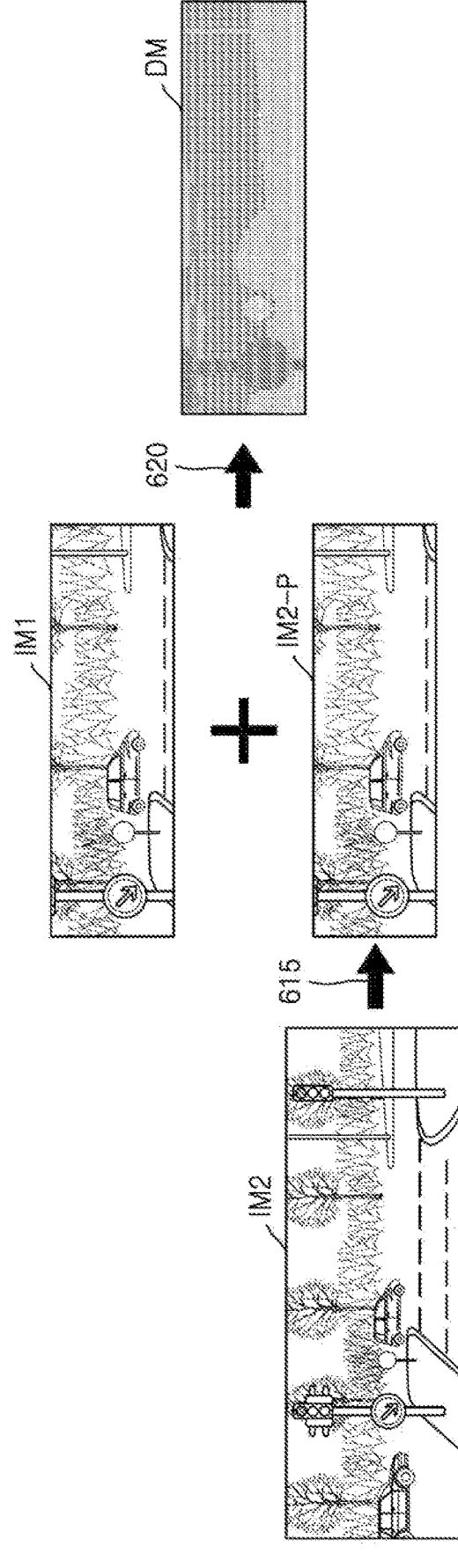
FIG. 6 is a diagram illustrating an operation of an electronic device obtaining a depth map from a plurality of 2D images according to an embodiment of the disclosure.

FIG. 6 is a diagram illustrating an operation of an electronic device obtaining the depth map DM from a plurality of 2D images according to an embodiment of the disclosure.

The electronic device according to an embodiment of the disclosure may reconstruct the first 2D image IM1 into a 3D image based on the second 2D image IM2. This embodiment may correspond to the case where the FOV $a_3$ of the 3D image to be generated by the electronic device in FIG. 1 is the FOV $a_1$ of the first image IM1 ($a_1=a_3$).

Referring to FIG. 6, the electronic device may obtain the first image IM1 through a first camera embedded therein, and may obtain the second image IM2 including the first image IM1 and having a wider FOV than that of the first image IM1 through a second camera embedded therein.

In operation 615, the electronic device may preprocess the second image IM2 based on the FOV $a_1$ of the first image IM1. The operation of preprocessing the second image IM2 may include warping an image axis of the second image IM2 to be the same as an image axis of the first image IM1, cropping the second image IM2 in accordance with the FOV $a_1$, and enlarging the second image IM2, which is cropped to have the FOV $a_1$ to have the same size as that of the first image IM1.

A preprocessed second image IM2-P may have the same image axis as that of the first image IM1 and may correspond to an image of the same region as the first image IM1. For example, all pixels of the preprocessed second image IM2-P may correspond to all pixels included in the first image IM1 one-to-one. For example, the first image IM1 and the preprocessed second image IM2-P may include images corresponding to the same object, and object images included in the first image IM1 and the preprocessed second image IM2-P may have the same or similar size.

The electronic device may calculate a depth value with respect to each pixel included in the first image IM1 based on a disparity between the first image IM1 and the preprocessed second image IM2-P. For example, an operation of calculating the depth value may use stereo matching, triangulation, a proportional formula for a similar triangle, or a deep learning scheme.

The electronic device may obtain 2D location coordinates with respect to first pixels included in the first 2D image IM1, and obtain 2D location coordinates with respect to second pixels included in the preprocessed second 2D image IM2-P. Thereafter, the electronic device may obtain depth values of the first pixels based on 2D location coordinates of a specific first pixel, 2D location coordinates of the second pixel corresponding to the first pixel, the FOV of the first camera, the FOV of the second camera, and relative location information (e.g., a baseline length) of the first camera and the second camera.

In an embodiment of the disclosure, the depth map DM calculated based on the parallax between the first image IM1 and the preprocessed second image IM2-P may include a depth value with higher accuracy than the depth map DM estimated by applying an artificial intelligence model to the single first image IM with.

FIG. 7A is a diagram illustrating an operation of an electronic device identifying the foreground image FG and the background image BG according to an embodiment of the disclosure, and FIG. 7B is a diagram illustrating an operation of an electronic device identifying a first layer image LI1 and a second layer image LI2 according to an embodiment of the disclosure.

The electronic device according to an embodiment of the disclosure may reconstruct a first 2D1 image into a 3D image based on a second 2D image. This embodiment may correspond to the case where the FOV $a_3$ of the 3D image to be generated by the electronic device in FIG. 1 is the FOV $a_1$ of the first image ($a_1=a_3$).

Referring to FIG. 7A, the electronic device may identify the foreground image FG and the background image BG from the first image based on depth information of the first image included in a depth map for each pixel. In an embodiment of the disclosure, the electronic device may identify an image region corresponding to a target object as the foreground image FG, and may identify a region of the first image excluding the foreground image FG as the background image BG. For example, the target object may indicate an object to render an image on a front layer when a 3D image is generated. Referring to FIG. 7A, the target object may be a duck. In this regard, the foreground image FG may include pixels corresponding to a duck image in the first image, and the background image BG may correspond to a region (e.g., land, water, etc.) of the first image excluding the duck image.

On the first image, a depth value between adjacent pixels may abruptly change or a discontinuous depth value may appear at a boundary part of images corresponding to different objects. Accordingly, by referring to the depth map corresponding to the first image, the electronic device may obtain information related to edges of objects included in the first image. In an embodiment of the disclosure, the electronic device may distinguish the foreground image FG and the background image BG from the first image based on depth information of the first image included in the depth map for each pixel.

Referring to FIG. 7B, the electronic device may identify the second layer image LI2 including the foreground image FG and the first layer image LI1 including the background image BG from the first image. The first layer image LI1 and the second layer image LI2 may each have the same size as that of the first image. Referring to FIG. 7B, the second layer image LI2 may have pixel values of only pixels included in a region corresponding to the foreground image FG. The first layer image LI1 may have pixel values of only pixels included in a region corresponding to the background image BG, that is, pixels included in a region excluding the region corresponding to the target object. A pixel having no value in the first layer image LI1 or the second layer image LI2 may be displayed transparently when the image is rendered. A combination of the first layer image LI1 and the second layer image LI2 may constitute the first image. A pixel included in the first image may be included in at least one of the first layer image LI1 or the second layer image LI2.

Figure 8:
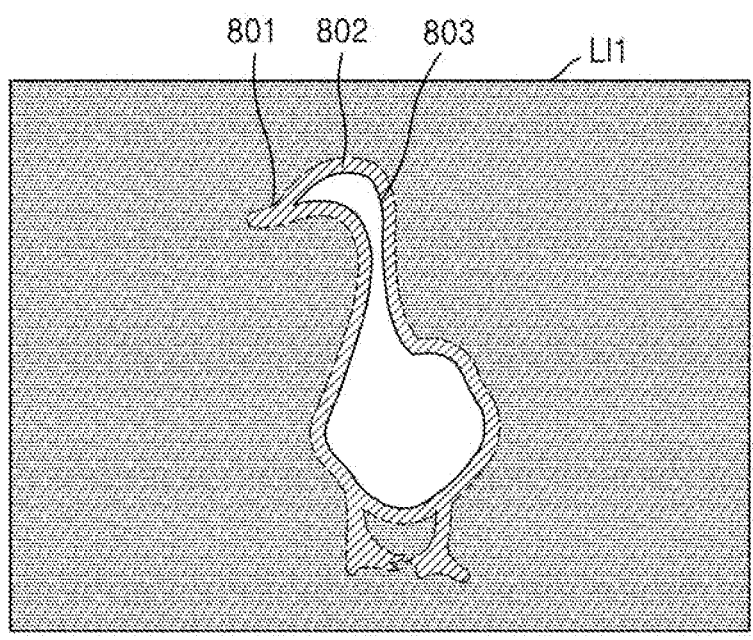
FIG. 8 is a diagram illustrating an operation of an electronic device inpainting at least a part of an image according to an embodiment of the disclosure.

FIG. 8 is a diagram illustrating an operation of an electronic device inpainting at least a part of an image according to an embodiment of the disclosure.

The electronic device according to an embodiment of the disclosure may reconstruct a first 2D image into a 3D image based on a second 2D image. This embodiment may correspond to the case where the FOV $a_3$ of the 3D image to be generated by the electronic device in FIG. 1 is the FOV $a_1$ of the first image IM1 ($a_1=a_3$).

Referring to FIG. 8, the electronic device may inpaint at least a part of the image based on a first image and a second image. In an embodiment of the disclosure, the electronic device may determine at least a part of the first layer image LI1 as an inpainting region 802 to be inpainted, and with respect to a specific pixel in the determined inpainting region 802, determine an image to be used for determining a pixel value of a corresponding pixel in the first image or the second image.

The inpainting region 802 may include the background image BG and at least a part of a region corresponding to the foreground image FG on the first layer image LI1. Referring to FIG. 8, the inpainting region 802 may be identified based on an outer boundary line 801 and an inner boundary line 803. For example, the inpainting region 802 may have a frame shape including pixels disposed between the outer boundary line 801 and the inner boundary line 803. The outer boundary line 801 of the inpainting region 802 may be represented as a boundary line between the background image BG and the foreground image FG in the first image. For example, the outer boundary line 801 may correspond to an edge of a target object image corresponding to the foreground image FG. A pixel on which an inpainting operation is performed and a pixel on which the inpainting operation is not performed may be distinguished with respect to the inner boundary line 803 of the inpainting region 802.

In an embodiment of the disclosure, the inpainting region 802 may be determined based on a depth map corresponding to the first image. For example, when a difference between depth values of the foreground image FG and the background image BG on the depth map is large, the inpainting region 802 may be widened, and when the difference between the depth values of the foreground image FG and the background image BG is small, the inpainting region 802 may be narrowed.

When the difference between the depth values of the foreground image FG and the background image BG is large, the foreground image FG may move relatively large on the background image BG even when an angle at which a user views the 3D image is slightly changed. Therefore, in this case, a large part of the image may be inpainted so as to generate a more realistic 3D image. For example, N pixels may be included on a vertical line or a horizontal line between the outer boundary line 801 and the inner boundary line 803 of the inpainting region 802.

When the difference between the depth values of the foreground image FG and the background image BG is small, the foreground image FG may move relatively small on the background image BG even when the angle at which the user views the 3D image is greatly changed. Accordingly, in this case, even when only a relatively narrow part of the image is inpainted, a realistic 3D image may be generated. For example, n pixels may be included on the vertical line or the horizontal line between the outer boundary line 801 and the inner boundary line 803 of the inpainting region 802, and n may be smaller than N (N≥n).

A threshold angle with respect to a change in a user's gaze of the 3D image according to an embodiment of the disclosure may be about 10 degrees. In this case, a part (e.g., a region in which no pixel value exists on the first layer image LI1 or an entire region inside the outer boundary line 801) of the background image BG of the first layer image LI1 that is not photographed by being covered by the foreground image FG may not be entirely the inpainting region 802.

Figure 9:
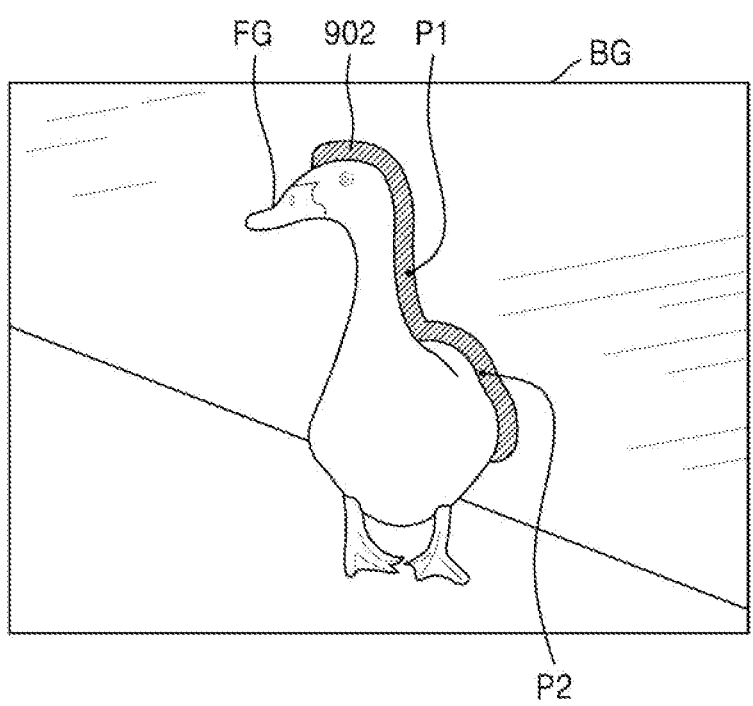
FIG. 9 is a diagram illustrating an operation of an electronic device inpainting an image by using a plurality of 2D images according to an embodiment of the disclosure.

FIG. 9 is a diagram illustrating an operation of an electronic device inpainting an image by using a plurality of 2D images according to an embodiment of the disclosure.

Referring to FIG. 9, a 3D image may include a second layer on which a second layer on which a second layer image including the foreground image FG is rendered and a first layer on which an inpainted first layer image including the background image BG is rendered. An angle at which a user views the 3D image may change beyond a threshold angle. When the angle at which the user views the 3D image changes from a vertical direction of an image plane, the first layer image and the second layer image rendered on layers having different depths from the user's eyes may be recognized to be deviated in the horizontal direction of the image plane. For example, FIG. 9 illustrates a case in which the user views the image from the upper right side compared to the front side.

In an embodiment of the disclosure, when the user views the 3D image from the front, an outer boundary line of the foreground image FG may overlappingly appear on an outer boundary line of an inpainting region 902. That is, when the user views the 3D image from the front, the inpainting region 902 may not be visible at all. When a gaze direction of a user changes from the front to a threshold angle, the outer boundary line of the foreground image FG may move from the outer boundary line to an inner boundary line of the inpainting region 902. In this case, the 3D image may display the inpainted inpainting region 902 on a part from the outer boundary line of the inpainting region 902 to the outer boundary line of the foreground image FG. When the user's gaze changes more than the threshold angle, the 3D image may be displayed like a 2D image in which the inner boundary line of the inpainting region 902 is fixed to the outer boundary line of the foreground image FG.

In an embodiment of the disclosure, the electronic device may determine an image to be used for determining a pixel value of the corresponding pixel from among the first image and the second image based on a relative location of the specific pixel inside the inpainting region 902. The inpainting region 902 of FIG. 9 may represent a part of the inpainting region 802 of FIG. 8 described above. The embodiment of the disclosure shown in FIG. 9 illustrates a case in which the angle at which the user views the 3D image is greater than or equal to the threshold angle.

A boundary line on the background image BG of the inpainting region 902 may be represented as an outer boundary line, and a boundary line on a region in which inpainting is not performed may be represented as an inner boundary line. For example, when a first pixel P1 of which pixel value is to be determined is closer to the outer boundary line than the inner boundary line, the first pixel P1 may be considered to correspond to a 'background' region. Accordingly, in this case, the second image including more information about the 'background' region compared to the first image having a small FOV may be determined as the image to be used for determining the pixel value of the first pixel P1. Also, for example, when a second pixel P2 of which pixel value is to be determined is closer to the inner boundary line than the outer boundary line, the second pixel P2 may be considered to correspond to a 'foreground' area (target object). Accordingly, in this case, the first image including a target object image having a relatively high resolution due to the small FOV may be determined as the image to be used for determining the pixel value of the second pixel P2.

An operation of determining the image to be used for determining a pixel value of a specific pixel in the inpainting region 902 among the first image and the second image is not limited to the above-described method, and may be determined by various methods.

In an embodiment of the disclosure, the electronic device may identify an object image corresponding to a specific pixel, when the corresponding object image is entirely included in the first image, determine the first image to be used for determining a pixel value of the corresponding pixel, and, when the corresponding object image is not entirely included in the first image, determine the second image to be used for determining the pixel value of the corresponding pixel.

For example, when all objects corresponding to a specific pixel are included in the first image, information for determining the pixel value of the corresponding pixel may be sufficiently included in the first image. Accordingly, in this case, a pixel value with high accuracy may be obtained even though the first image is determined as the image to be used for determining the pixel value of the corresponding pixel. When all objects corresponding to the specific pixel are not included in the first image, the image of the corresponding object may be included over more pixels in the second image having a wider FOV than that of the first image. That is, more information for determining the pixel value of the corresponding pixel may be included in the second image than in the first image. Accordingly, in this case, the second image may be determined as the image to be used for determining the pixel value of the corresponding pixel.

Figure 10:
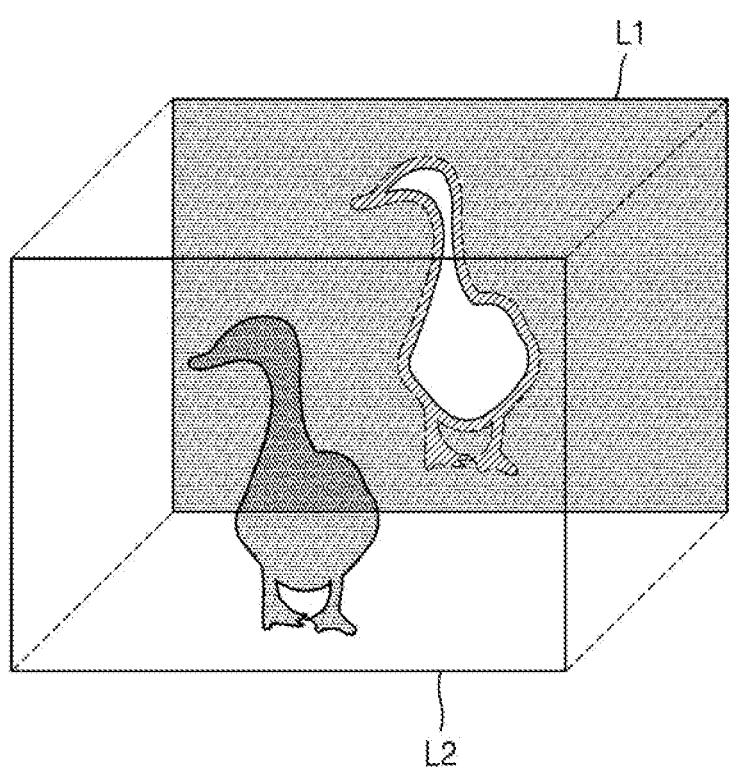
FIG. 10 is a diagram illustrating an operation of an electronic device generating a 3D image including a plurality of layers according to an embodiment of the disclosure.

FIG. 10 is a diagram illustrating an operation of an electronic device generating a 3D image including a plurality of layers L1 and L2 according to an embodiment of the disclosure.

The electronic device according to an embodiment of the disclosure may generate the 3D image including the two layers L1 and L2. Among the two layers L1 and L2, the second layer image LI2 including the foreground image FG may be rendered on the second layer L2, and the inpainted first layer image LI1 including the background image BG may be rendered may be rendered on the first layer L1. A plane of the first layer L1 and a plane of the second layer L2 may have a parallel relationship.

The depth of a layer represents a vertical distance from user's eyes to the corresponding layer. Accordingly, the layer having the smaller depth among the two layers L1 and L2 is disposed at the front. Referring to FIG. 10, the depth of the second layer L2 may be smaller than the depth of the first layer L1. A pixel value of the second layer L2 disposed at the front may have priority over a pixel value of the first layer L1 disposed at the rear. For example, among a first pixel of the first layer L1 and a second pixel of the second layer L2 that overlap in a gaze direction of a user, the user may recognize a pixel value of the second pixel.

In an embodiment of the disclosure, the electronic device may generate a 3D image including three or more layers. The second layer image LI2 including the foreground image FG may be rendered on at least one layer of a plurality of layers included in the 3D image, and the first layer image LI1 including the background image BG may be rendered on at least one layer.

Figure 11:
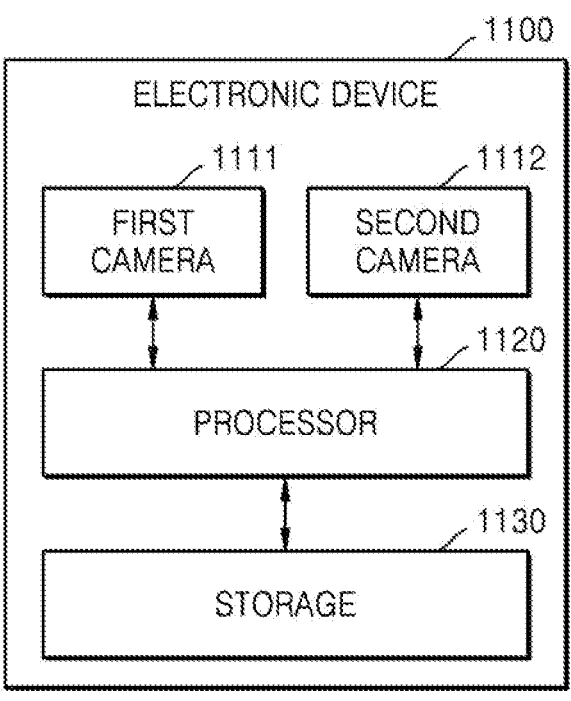
FIG. 11 is a block diagram of an electronic device according to an embodiment of the disclosure.

FIG. 11 is a block diagram of an electronic device 1100 according to an embodiment of the disclosure.

The electronic device 1100 may be a device that obtains a 2D input image or an input image and outputs a 3D output image or an output image. The electronic device 1100 may be configured as, for example, a smart phone, a tablet personal computer (PC), a mobile phone, a video phone, an e-book reader, a desktop PC, a laptop PC, netbook computer, workstation, server, a personal digital assistant (PDA), a portable multimedia player (PMP), an MP3 player, a mobile medical device, a camera, a wearable device, a home appliance, or various computing devices. The electronic device 1100 according to an embodiment of the disclosure is not limited to the above-described examples, and the electronic device 1100 may include various types of devices including a plurality of cameras, and obtaining, processing, and outputting images or videos.

Referring to FIG. 11, the electronic device 1100 may include a first camera 1111, a second camera 1112, a processor 1120, and a storage 1130. All of components shown in FIG. 11 are not indispensable components of the electronic device 1100. The electronic device 1100 may be implemented by more components than those illustrated in FIG. 11, or the electronic device 1100 may be implemented by fewer components than those illustrated in FIG. 11.

Each of the first camera 1111 and the second camera 1112 may include a digital photographing device. In an embodiment of the disclosure, each of the first camera 1111 and the second camera 1112 may obtain an input video or an input image. In an embodiment of the disclosure, each of the first camera 1111 and the second camera 1112 may capture an image corresponding to its FOV.

In an embodiment of the disclosure, each of the first camera 1111 and the second camera 1112 may obtain a 2D image. The electronic device 1100 may obtain a 3D image of a front region or an object by using the first camera 1111 and the second camera 1112. Each of the first camera 1111 and the second camera 1112 may be configured as a telephoto camera, a wide-angle camera, or an ultra-wide-angle camera. In an embodiment of the disclosure, the first camera 1111 and the second camera 1112 may have different FOVs. For example, when the FOV of the first camera 1111 is $a_{-1}$ and the FOV of the second camera 1112 is $a_2$, $a_{-1}$ may be smaller than or equal to $a_2$ ($a_1 \leq a_2$). In this case, a second image obtained through the second camera 1112 may include information corresponding to a wider region than that of a first image obtained through the first camera 1111. For example, a real region corresponding to the first image obtained through the first camera 1111 may be included in a real region corresponding to the second image obtained through the second camera 1112.

The storage 1130 may store a program that is to be executed by the processor 1120 to be described below for controlling an operation of the electronic device 1100. The storage 1130 may store a program including one or more instructions for controlling the operation of the electronic device 1100. Instructions and program code readable by the processor 1120 may be stored in the storage 1130. According to an embodiment of the disclosure, the processor 1120 may be implemented to execute instructions or codes of the program stored in the storage 1130. The storage 1130 may store data that is input to the electronic device 1100 or output by the electronic device 1100.

The storage 1130 may include at least one type of storage medium from among a flash memory, a hard disk, a multimedia card micro type storage medium, a card type memory (for example, SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk. However, the storage 1130 is not limited to the above-described examples, and may include any type of storage medium in which data may be stored.

The processor 1120 may control overall operations of the electronic device 1100. For example, the processor 1120 may control all of the first camera 1111, the second camera 1112, and the storage 1130 by executing the programs stored in the storage 1130.

The processor 1120 may include hardware components that perform arithmetic, logic, and input/output operations and signal processing. The processor 1120 may include, but not limited to, at least one of a central processing unit, a microprocessor, a graphics processing unit, application specific integrated circuits (ASICs), DSPs, digital signal processing devices (DSPDs), programmable logic devices (PLDs), or field programmable gate arrays (FPGAs).

The processor 1120 may execute the one or more instructions stored in the storage 1130 to reconfigure a first 2D image obtained through the first camera 1111 into the 3D image based on a second 2D image obtained through the second camera 1112. For example, the processor 1120 may execute the one or more instructions stored in the storage 1130 to obtain a first image through the first camera 1111 and a second image through the second camera 1112, obtain depth information of a pixel included in the first image, identify a first layer image and a second layer image from the first image based on the depth information, inpaint at least a part of the first layer image, based on the first image and the second image, and generate a 3D image including a plurality of layers, based on the second layer image and the inpainted first layer image.

An operation of the processor 1120 obtaining the first image through the first camera 1111 and the second image through the second camera 1112 may correspond to operation S210 of FIG. 2 described above. An operation of the processor 1120 obtaining the depth information of the pixel included in the first image may correspond to operation S220 of FIG. 2 described above. An operation of the processor 1120 identifying the first layer image and the second layer image from the first image based on the depth information may correspond to operation S230 of FIG. 2 described above. The operation of the processor 1120 inpainting at least a part of the first layer image, based on the first image and the second image may correspond to operation S240 of FIG. 2 described above. An operation of the processor 1120 generating the 3D image including the plurality of layers, based on the second layer image and the inpainted first layer image may correspond to operation S250 of FIG. 2 described above.

As described above, according to an embodiment of the disclosure, the 3D image may be generated from the plurality of images obtained by using the plurality of cameras having different FOVs, and thus, more pixel information may be used for an inpainting operation of an image, and artifacts occurring at the boundary part between the foreground image and the background image may be reduced, thereby generating a realistic 3D image.

An embodiment of the disclosure may be implemented or supported by one or more computer programs, and the computer programs may be formed from computer-readable program code and may be included in a computer-readable medium. In the disclosure, the terms "application" and "program" may refer to one or more computer programs, software components, instruction sets, procedures, functions, objects, classes, instances, related data, or a portion thereof suitable for implementation in computer-readable program code. The "computer readable program code" may include various types of computer code including source code, object code, and executable code. The "computer-readable medium" may include various types of mediums accessed by a computer, such as read only memories (ROMs), random access memories (RAMs), hard disk drives (HDDs), compact disks (CDs), digital video disks (DVDs), or various types of memories.

Also, a machine-readable storage medium may be provided in the form of a non-transitory storage medium. Here, the 'non-transitory storage medium' may be a tangible device and may exclude wired, wireless, optical, or other communication links for transmitting temporary electrical or other signals. Moreover, the 'non-transitory storage medium' may not distinguish between a case where data is semipermanently stored in the storage medium and a case where data is temporarily stored therein. For example, the "non-transitory storage medium" may include a buffer in which data is temporarily stored. The computer-readable medium may be any available medium accessible by a computer and may include volatile or non-volatile mediums and removable or non-removable mediums. The computer-readable medium may include a medium in which data may be permanently stored and a medium in which data may be stored and may be overwritten later, such as a rewritable optical disk or an erasable memory device.

According to an embodiment of the disclosure, the method according to various embodiments of the disclosure may be included and provided in a computer program product. The computer program product may be traded as a product between a seller and a buyer. The computer program product may be distributed in the form of a machine-readable storage medium (e.g., a compact disk read only memory (CD-ROM)) or may be distributed (e.g., downloaded or uploaded) online through an application store or directly between two user devices. In the case of online distribution, at least a portion of the computer program product (e.g., a downloadable app) may be at least temporarily stored or temporarily generated in a machine-readable storage medium such as a manufacturer's server, a server of an application store, or a memory of a relay server.

The foregoing is illustrative of embodiments of the disclosure, and those of ordinary skill in the art will readily understand that various modifications may be made therein without materially departing from the spirit or features of the disclosure. Therefore, it is to be understood that the embodiments described above should be considered in a descriptive sense only and not for purposes of limitation. For example, each component described as a single type may also be implemented in a distributed manner, and likewise, components described as being distributed may also be implemented in a combined form.

The scope of the disclosure is defined not by the above detailed description but by the following claims, and all modifications derived from the meaning and scope of the claims and equivalent concepts thereof should be construed as being included in the scope of the disclosure.

What is claimed is:

1. A method, performed by an electronic device, of generating a three-dimensional (3D) image, the method comprising:
  obtaining a first image through a first camera of the electronic device and obtaining a second image through a second camera of the electronic device;
  obtaining depth information of pixels included in the first image;
  identifying, based on the depth information, a background image and a foreground image from the first image, wherein the background image corresponds to the first image excluding the foreground image;

determining a part of the background image as an inpainting region;

inpainting, based on an image from among the first image and the second image, the inpainting region; and generating, based on the foreground image and the inpainted background image, the 3D image comprising a plurality of layers, wherein the plurality of layers of the 3D image include a first layer corresponding to the inpainted background image and a second layer corresponding to the foreground image.

2. The method of claim 1, wherein a second field of view (FOV) of the second camera is larger than a first FOV of the first camera, and wherein a region corresponding to the first image is included in a region corresponding to the second image.

3. The method of claim 2, further comprising preprocessing the second image, wherein the preprocessing the second image comprises cropping the second image or warping an axis of the second image.

4. The method of claim 1, wherein the obtaining the depth information of the pixels included in the first image comprises obtaining depth information of a first pixel, based on a parallax between the first pixel included in the first image and a second pixel, the second pixel being included in the second image and corresponding to the first pixel.

5. The method of claim 1, wherein the obtaining the depth information of the pixels included in the first image comprises using an artificial intelligence model trained to output a depth map comprising depth information of pixels included in the first image by using the first image as an input value.

6. The method of claim 1, wherein the identifying the background image and the foreground image from the first image based on the depth information comprises:

identifying an image region corresponding to a target object as the foreground image.

7. The method of claim 1, wherein the inpainting the inpainting region comprises:

determining the image from among the first image and the second image as an image to be used for determining a pixel value of a specific pixel in the inpainting region; and determining the pixel value of the specific pixel, based on the determined image.

8. The method of claim 7, wherein the inpainting region comprises at least a part of a region corresponding to the foreground image, and the inpainting region is determined based on a depth map corresponding to the first image.

9. The method of claim 7, wherein the inpainting region comprises an inner boundary line and an outer boundary line, and wherein the determining the image to be used for determining the pixel value of the specific pixel is performed based on a relative location of the specific pixel in the inpainting region, the relative location indicating a location of the specific pixel relative to the inner boundary line and the outer boundary line of the inpainting region.

10. The method of claim 7, wherein the determining the image to be used for determining the pixel value of the specific pixel comprises:

identifying an object image corresponding to the specific pixel;

based on the corresponding object image being entirely included in the first image, determining the first image as the image to be used for determining the pixel value of the specific pixel; and based on the corresponding object image not being entirely included in the first image, determining the second image as the image to be used for determining the pixel value of the specific pixel.

11. The method of claim 1, wherein the generating the 3D image comprises rendering the inpainted background image on the first layer and rendering the foreground image on the second layer.

12. A non-transitory computer-readable recording medium having recorded thereon a program that is executable by a computer to perform the method of claim 1.

13. An electronic device comprising:

a first camera;

a second camera;

a storage storing one or more instructions; and at least one processor configured to execute the one or more instructions stored in the storage to:

obtain a first image through the first camera and obtain a second image through the second camera, obtain depth information of pixels included in the first image, identify, based on the depth information, a background image and a foreground image from the first image, wherein the background image corresponds to the first image excluding the foreground image, determine a part of the background image as an inpainting region, inpaint, based on an image from among the first image and the second image, the inpainting region, and generate, based on the foreground image and the inpainted background image, a three-dimensional (3D) image comprising a plurality of layers, wherein the plurality of layers of the 3D image include a first layer corresponding to the inpainted background image and a second layer corresponding to the foreground image.

14. The electronic device of claim 13, wherein a second field of view (FOV) of the second camera is larger than a first FOV of the first camera, and wherein a region corresponding to the first image is included in a region corresponding to the second image.

15. The electronic device of claim 13, wherein the at least one processor is further configured to execute the one or more instructions to obtain depth information of a first pixel, based on a parallax between the first pixel included in the first image and a second pixel, the second pixel being included in the second image and corresponding to the first pixel.

* * * * *